US012801992B2

(12) United States Patent
Sakpal et al.

(10) Patent No.: US 12,801,992 B2
(45) Date of Patent: Nov. 17, 2026

(54) ARTIFICIAL INTELLIGENCE ENGINE FOR TRANSACTION CATEGORIZATION AND CLASSIFICATION

(71) Applicant: Mastercard International Incorporated, Purchase, NY (US)

(72) Inventors: Yogesh Sakpal, Mumbai (IN); Sachin Pandey, Gorakhpur (IN); Dean Vaz, Hyderabad (IN); Siddhesh Dongare, Kalyan (IN); Dmitriy Kontarev, Allen, TX (US); Brett Ragozzine, Lehi, UT (US); Christopher Brousseau, Provo, UT (US)

(73) Assignee: Mastercard International Incorporated, Purchase, NY (US)

( * ) Notice: Subject to any disclaimer, the term of this patent is extended or adjusted under 35 U.S.C. 154(b) by 701 days.

(21) Appl. No.: 18/324,307

(22) Filed: May 26, 2023

(65) Prior Publication Data

US 2023/0385700 A1 Nov. 30, 2023

(30) Foreign Application Priority Data

May 30, 2022 (IN) ............................ 202211030971

(51) Int. Cl.
*G06N 20/00* (2019.01)
*G06F 40/242* (2020.01)
(Continued)

(52) U.S. Cl.
CPC ........... *G06N 20/00* (2019.01); *G06F 40/242* (2020.01); *G06F 40/284* (2020.01); *G06F 40/295* (2020.01); *G06Q 20/401* (2013.01)

(58) Field of Classification Search
CPC .... G06F 40/284; G06F 40/242; G06F 40/295; G06F 40/401; G06N 20/00
See application file for complete search history.

(56) References Cited

U.S. PATENT DOCUMENTS

| | | | |
|---|---|---|---|
| 5,297,032 | A | 3/1994 | Trojan et al. |
| 5,761,442 | A | 6/1998 | Barr et al. |

(Continued)

FOREIGN PATENT DOCUMENTS

| | | |
|---|---|---|
| CN | 107273757 | 10/2017 |
| CN | 113592035 | 11/2021 |
| CN | 114462532 | 5/2022 |

OTHER PUBLICATIONS

Office Action from U.S. Appl. No. 18/324,321 Agile Iteration for Data Mining Using Artificial Intelligence (Mar. 11, 2025).

(Continued)

*Primary Examiner* — Gerald J Sufleta, II
(74) *Attorney, Agent, or Firm* — Hovey Williams LLP

(57) ABSTRACT

Techniques for training a classification model to improve the classification of open banking transactions are presented. The techniques include receiving raw training data from a data source. The raw training data includes historical transaction data made up of a plurality of individual transactions. The raw training data is input into the classification model. The raw training data is processed by performing a data preparation operation on the raw training data. The data preparation operation includes removing numerical characters, repeating special characters, and accent words from the textual data of each transaction. Vocabulary training is then performed on the processed training data, including tokenizing the text of each transaction and converting the tokenized text into a transformer model specific format. The classification model is then trained using a transformer model, which uses the tokenized text. The trained classification model is then stored in a database.

20 Claims, 10 Drawing Sheets

(51) Int. Cl.

| | |
|---|---|
| ***G06F 40/284*** | (2020.01) |
| ***G06F 40/295*** | (2020.01) |
| ***G06Q 20/40*** | (2012.01) |

(56) References Cited

U.S. PATENT DOCUMENTS

| | | | | |
|---|---|---|---|---|
| 5,812,988 | A | 9/1998 | Sandretto | |
| 6,014,645 | A | 1/2000 | Cunningham | |
| 6,058,379 | A | 5/2000 | Odom et al. | |
| 6,313,833 | B1 | 11/2001 | Knight | |
| 6,345,090 | B1 | 2/2002 | Walker et al. | |
| 6,954,758 | B1 | 10/2005 | O Flaherty | |
| 7,165,037 | B2 | 1/2007 | Lazarus et al. | |
| 7,376,431 | B2 | 5/2008 | Niedermeyer | |
| 7,480,640 | B1 | 1/2009 | Elad et al. | |
| 7,496,534 | B2 * | 2/2009 | Olsen | G06Q 40/04 705/37 |
| 8,104,678 | B2 | 1/2012 | Yoshikawa et al. | |
| RE43,435 | E | 5/2012 | Krause | |
| 8,234,201 | B1 | 7/2012 | Canabarro | |
| 8,412,605 | B2 | 4/2013 | Griffin et al. | |
| 9,894,088 | B2 | 2/2018 | Ward et al. | |
| 2002/0161677 | A1 | 10/2002 | Zumbach et al. | |
| 2002/0184134 | A1 | 12/2002 | Olsen et al. | |
| 2003/0115192 | A1 | 6/2003 | Kil et al. | |
| 2003/0149648 | A1 | 8/2003 | Olsen et al. | |
| 2005/0187854 | A1 | 8/2005 | Cutler et al. | |
| 2005/0192899 | A1 | 9/2005 | Reardon | |
| 2007/0244795 | A1 | 10/2007 | Lutnick et al. | |
| 2008/0301019 | A1 | 12/2008 | Monk | |
| 2010/0023460 | A1 | 1/2010 | Hughes et al. | |
| 2010/0076787 | A1 | 3/2010 | Naylor et al. | |
| 2010/0312701 | A1 | 12/2010 | Bosch et al. | |
| 2011/0145149 | A1 | 6/2011 | Valdes et al. | |
| 2011/0178912 | A1 | 7/2011 | Parsons et al. | |
| 2011/0264581 | A1 | 10/2011 | Clyne | |
| 2012/0029956 | A1 | 2/2012 | Ghosh et al. | |
| 2012/0278254 | A1 | 11/2012 | Rosenthal et al. | |
| 2012/0323764 | A1 | 12/2012 | Boberski et al. | |
| 2013/0226764 | A1 | 8/2013 | Battyani | |
| 2014/0156491 | A1 | 6/2014 | Koh | |
| 2014/0229353 | A1 | 8/2014 | Lutnick et al. | |
| 2018/0107730 | A1 | 4/2018 | Parker et al. | |
| 2019/0340110 | A1 | 11/2019 | Kupitman et al. | |
| 2020/0202245 | A1 * | 6/2020 | Lesnik | G05B 13/0265 |
| 2020/0356816 | A1 | 11/2020 | Blalock et al. | |
| 2020/0394511 | A1 | 12/2020 | Kasai et al. | |
| 2021/0073662 | A1 | 3/2021 | Lokhande et al. | |
| 2021/0075782 | A1 | 3/2021 | Dunjic et al. | |
| 2021/0287048 | A1 | 9/2021 | Walters et al. | |
| 2021/0326888 | A1 * | 10/2021 | Adjaoute | G06N 5/048 |
| 2021/0327565 | A1 | 10/2021 | Buckland | |
| 2021/0342847 | A1 * | 11/2021 | Shachar | G06Q 20/4016 |
| 2021/0350380 | A1 | 11/2021 | Kuo et al. | |
| 2021/0357375 | A1 * | 11/2021 | Urdiales | G06N 3/0499 |
| 2023/0351194 | A1 * | 11/2023 | Wright | G06Q 30/0202 |
| 2023/0385825 | A1 | 11/2023 | Dongare | |
| 2024/0303466 | A1 * | 9/2024 | Sharma | G06N 5/01 |

OTHER PUBLICATIONS

International Search Report and Written Opinion for PCT Application No. PCT/US2023/023640 (Dated Sep. 15, 2023).

International Search Report and Written Opinion for PCT Application No. PCT/US2023/023651 (Dated Sep. 18, 2023).

International Search Report and Written Opinion for PCT Application No. PCT/US2023/023658 (Dated Sep. 18, 2023).

* cited by examiner

ARTIFICIAL INTELLIGENCE ENGINE FOR TRANSACTION CATEGORIZATION AND CLASSIFICATION

CROSS-REFERENCE TO RELATED APPLICATIONS

This application claims priority to Indian Application No. 202211030971, filed May 30, 2022, which is incorporated herein by reference in its entirety.

RELATED APPLICATIONS

The present application is filed contemporaneously with U.S. patent application Ser. No. 18/324,321, titled AGILE ITERATION FOR DATA MINING USING ARTIFICIAL INTELLIGENCE, and U.S. patent application Ser. No. 18/324,315, titled ARTIFICIAL INTELLIGENCE ENGINE FOR ENTITY RESOLUTION AND STANDARDIZATION. The entire disclosures of each of the aforementioned contemporaneously filed applications are hereby incorporated herein by reference in their entireties.

FIELD OF THE DISCLOSURE

The field of the disclosure relates to transaction data analysis and, more particularly, to one or more artificial intelligence models configured to determine classification and entity resolution for transaction data.

BRIEF DESCRIPTION OF THE DISCLOSURE

This brief description is provided to introduce a selection of concepts in a simplified form that are further described in the detailed description below. This brief description is not intended to identify key features or essential features of the inventive subject matter, nor is it intended to be used to limit the scope of the inventive subject matter. Other aspects and advantages of the present disclosure will be apparent from the following detailed description of the embodiments and the accompanying figures.

In one aspect, a computer-implemented method for training a classification model is provided. The method is performed by a server and includes receiving raw training data from a data source. The raw training data includes historical transaction data comprising a plurality of transactions. The method also includes inputting the raw training data into the classification model and generating processed training data by performing a data preparation operation on the raw training data. The data preparation operation includes removing numerical characters, repeating special characters, and accent words. In addition, the method includes performing vocabulary training on the processed training data. The vocabulary training includes tokenizing text of each transaction of the processed training data and converting the tokenized text into a transformer model specific format. Moreover, the method includes obtaining a transformer model and training the classification model using the transformer model and the tokenized text in the transformer model specific format. The trained classification model is then stored in a database.

In another aspect, a server for training a classification model is provided. The server includes a database, one or more processors, and a memory. The memory has computer-executable instructions stored thereon, that when executed by the one or more processors, cause the one or more processors to receive raw training data from a data source. The raw training data includes historical transaction data comprising a plurality of transactions. The one or more processors input the raw training data into the classification model and generate processed training data by performing a data preparation operation on the raw training data. The operation includes removing numerical characters, repeating special characters, and accent words. The one or more processors also perform vocabulary training on the processed training data, including tokenizing text of each transaction of the processed training data and converting the tokenized text into a transformer model specific format. Moreover, the one or more processors obtain a transformer model and train the classification model using the transformer model and the tokenized text in the transformer model specific format. The one or more processors then store the trained classification model in the database.

In another aspect, a non-transitory computer-readable storage medium is provided. The non-transitory computer-readable storage medium has computer-executable instructions stored thereon, that when executed by one or more processors, cause the one or more processors to receive raw training data from a data source. The raw training data includes historical transaction data comprising a plurality of transactions. The computer-executable instructions cause the one or more processors to input the raw training data into the classification model and generate processed training data by performing a data preparation operation on the raw training data. The operation includes removing numerical characters, repeating special characters, and accent words. The computer-executable instructions also cause the one or more processors to perform vocabulary training on the processed training data, including tokenizing text of each transaction of the processed training data and converting the tokenized text into a transformer model specific format. Moreover, the one or more processors are caused to obtain a transformer model and train the classification model using the transformer model and the tokenized text in the transformer model specific format. The one or more processors then store the trained classification model in the database.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Exemplary System

Figure 1:
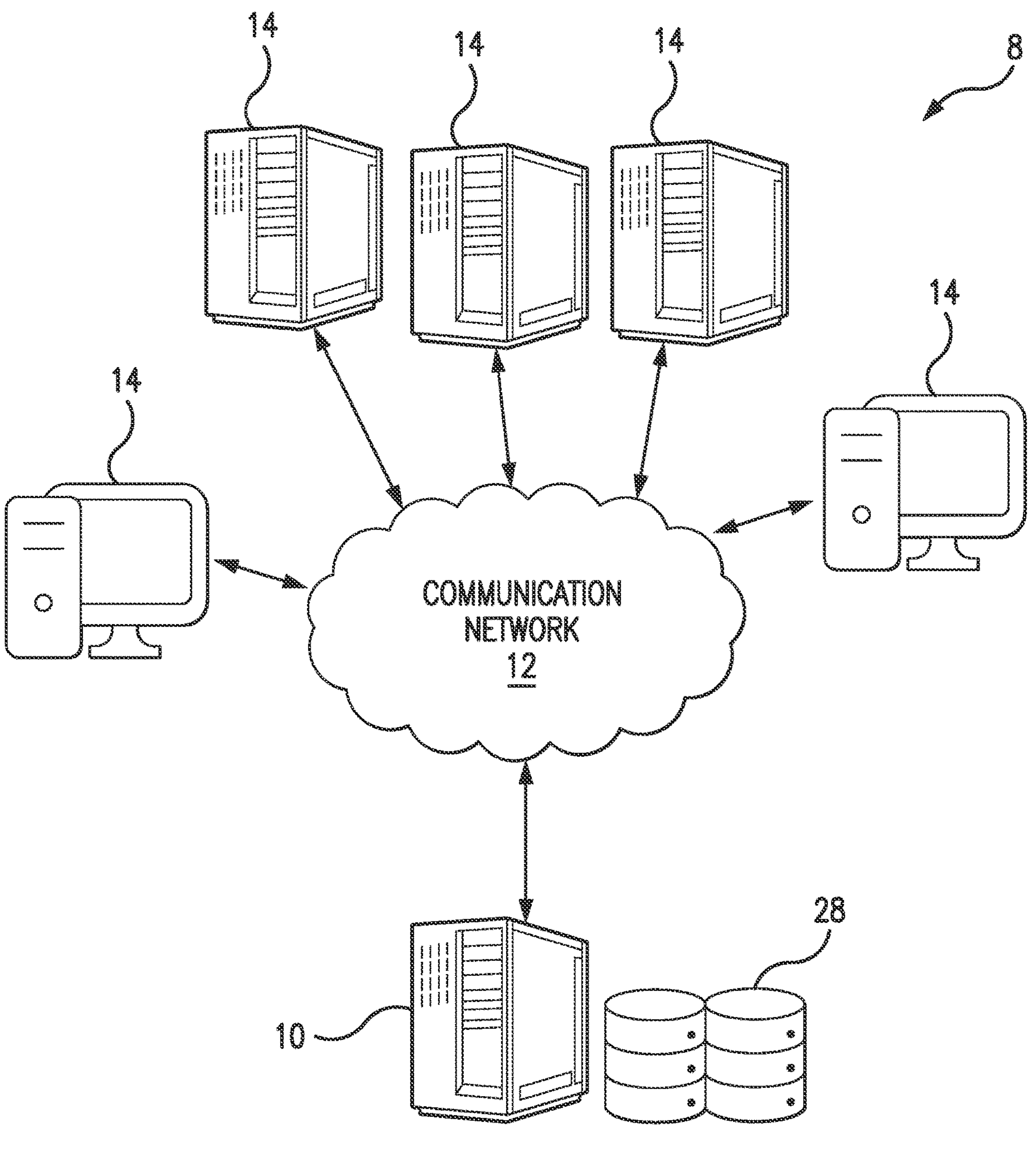
FIG. 1 depicts an exemplary system in which embodiments of a server may be utilized for providing data mining services, for example, on large batches of business data.

FIG. 1 depicts an exemplary system 8 in which embodiments of a server 10 may be utilized for providing data mining services, for example, on large batches of business data (e.g., transaction data and the like). The environment may include a communication network 12 and a plurality of data source computing devices 14. Each data source computing device 14 may include a desktop computer, a laptop or tablet computer, an application server, a database server, a file server, or the like, or combinations thereof, configured to periodically or continuously provide data and/or data updates to the server 10 for storing, for example, in a database 28. The server 10 may include and/or work in conjunction with application servers, database servers, file servers, gaming servers, mail servers, print servers, or the like, or combinations thereof. Furthermore, the server 10 may include a plurality of servers, virtual servers, or combinations thereof.

The communication network 12 may provide wired and/or wireless communication between the data source computing devices 14 and the server 10. Each of the server 10 and data source computing devices 14 may be configured to send data to and/or receive data from network 12 using one or more suitable communication protocols, which may be the same communication protocols or different communication protocols as one another.

The communication network 12 generally allows communication between the data source computing devices 14 and the server 10. For example, the data source computing devices 14 may, upon request, periodically and/or continuously push or otherwise provide new or updated data to the server 10 over the communication network 12.

The network 12 may include one or more telecommunication networks, nodes, and/or links used to facilitate data exchanges between one or more devices and may facilitate a connection to the Internet for devices configured to communicate with network 12. The communication network 12 may include local area networks, metro area networks, wide area networks, cloud networks, the Internet, cellular networks, plain old telephone service (POTS) networks, and the like, or combinations thereof.

The communication network 12 may be wired, wireless, or combinations thereof and may include components such as modems, gateways, switches, routers, hubs, access points, repeaters, towers, and the like. The data source computing devices 14 and the server 10 may connect to the communication network 12 either through wires, such as electrical cables or fiber optic cables, or wirelessly, such as radio frequency (RF) communication using wireless standards such as cellular 3G, 4G, 5G, and the like, Institute of Electrical and Electronics Engineers (IEEE) 802.11 standards such as WiFi, IEEE 802.16 standards such as WiMAX, Bluetooth™, or combinations thereof. In aspects in which the network 12 facilitates a connection to the Internet, data communications may take place over the network 12 via one or more suitable Internet communication protocols. For example, the network 12 may be implemented as a wireless telephony network (e.g., GSM, CDMA, LTE, etc.), a Wi-Fi network (e.g., via one or more IEEE 802.11 Standards), a WiMAX network, a Bluetooth network, etc.

Figure 2:
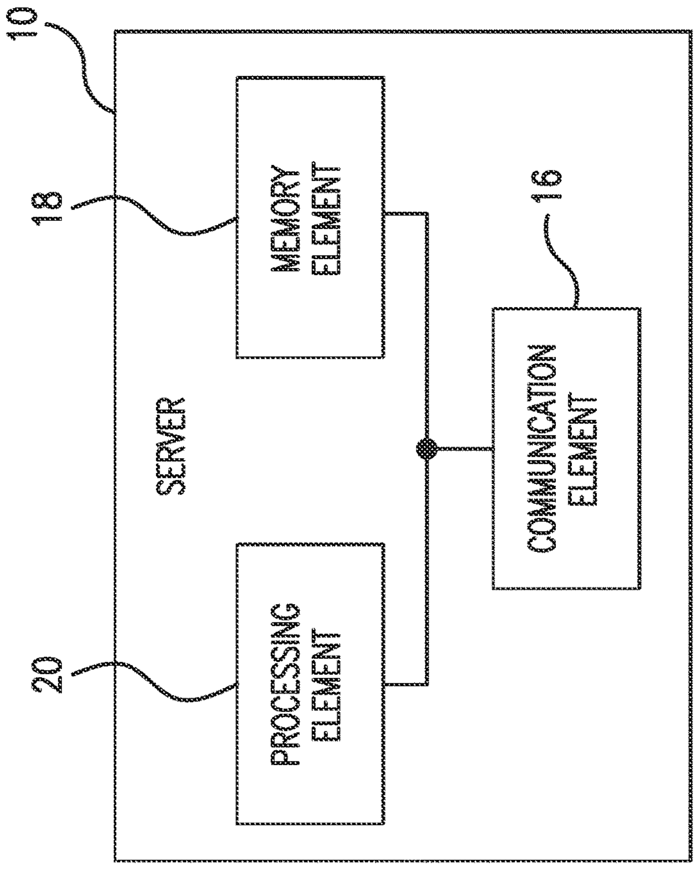
FIG. 2 is an example configuration of a server for use in the system shown in FIG. 1.
Figure 3:
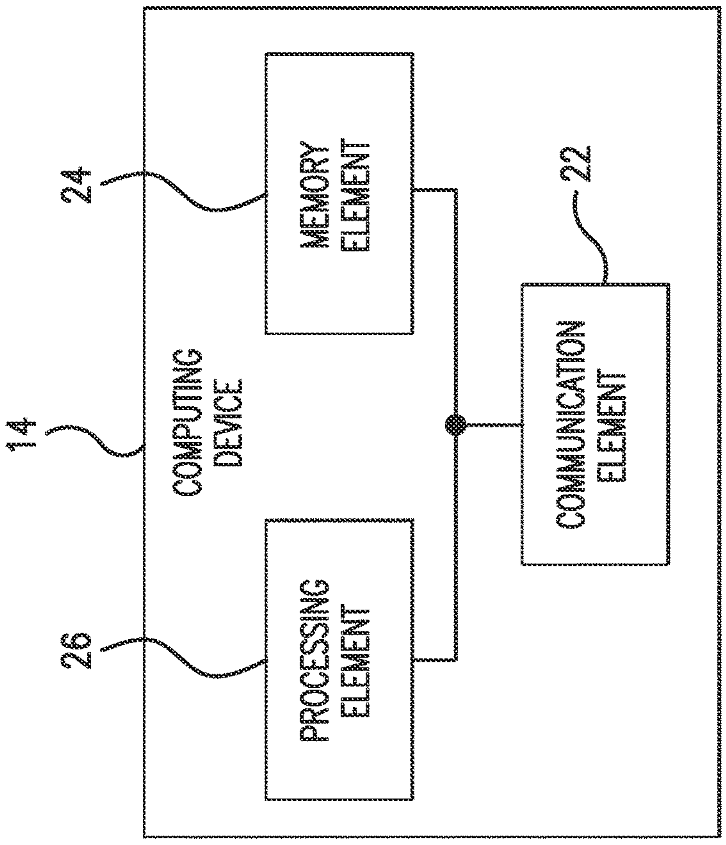
FIG. 3 is an example configuration of a data source computing device for use in the system shown in FIG. 1.

The server 10 generally retains electronic data and may respond to requests to retrieve data, as well as to store data. The server 10 may be configured to include or execute software, such as file storage applications, database applications, email or messaging applications, web server applications, and/or prediction software or the like. As indicated in FIG. 2, the server 10 may broadly comprise a communication element 16, a memory element 18, and a processing element 20. Likewise, as indicated in FIG. 3, each of the data source computing devices 14 may broadly comprise a communication element 22, a memory element 24, and a processing element 26.

The communication elements 16, 22 each generally allow communication with external systems or devices, including network 12, such as via wireless communication and/or data transmission over one or more direct or indirect radio links between devices. The communication elements 16, 22 each may include signal or data transmitting and receiving circuits, such as antennas, amplifiers, filters, mixers, oscillators, digital signal processors (DSPs), and the like. The communication elements 16, 22 each may establish communication wirelessly by utilizing RF signals and/or data that comply with communication standards such as cellular 2G, 3G, or 4G, WiFi, WiMAX, Bluetooth™, and the like, or combinations thereof. In addition, the communication elements 16, 22 each may utilize communication standards such as ANT, ANT+, Bluetooth™ low energy (BLE), the industrial, scientific, and medical (ISM) band at 2.4 gigahertz (GHz), or the like.

Alternatively, or in addition, the communication elements 16, 22 each may establish communication through connectors or couplers that receive metal conductor wires or cables which are compatible with networking technologies, such as ethernet. In certain embodiments, the communication elements 16, 22 each may also couple with optical fiber cables. The communication elements 16, 22 each may be in communication with corresponding ones of the processing elements 20, 26 and the memory elements 18, 24, via, e.g., wired or wireless communication.

The memory elements 18, 24 each may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 18, 24 each may be embedded in, or packaged in the same package as, the corresponding one of the processing elements 20, 26. The memory elements 18, 24 each may include, or may constitute, a "computer-readable medium." The memory elements 18, 24 each may store computer-executable instructions, code, code segments, software, firmware, programs, applications, apps, modules, agents, services, daemons, or the like that are executed by the processing elements 20, 26, including—in the case of processing element 20 and the memory element 18—the prediction software or the like. The memory elements 18, 24 each may also store settings, data, documents, sound files, photographs, movies, images, databases, and the like, including the items described throughout this disclosure.

The processing elements 20, 26 each may include electronic hardware components such as processors. The processing elements 20, 26 each may include digital processing unit(s). The processing elements 20, 26 each may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 20, 26 each may generally execute, process, or run instructions, code, code segments, software, firmware, programs, applications, apps, modules, agents, processes, services, daemons, or the like, including—in the case of processing element 20—one or more artificial intelligence models and/or the structured data mining processes described throughout this disclosure. The processing elements 20, 26 each may also include hardware components such as finite-state machines, sequential and combinational logic, and other electronic circuits that can perform the functions necessary for the operation of the current invention. The processing elements 20, 26 each may be in communication with the other electronic components through serial or parallel links that include address busses, data busses, control lines, and the like.

Through hardware, software, firmware, or combinations thereof, the processing elements 20, 26 each may be configured or programmed to perform the functions described hereinbelow.

Exemplary Computer-Implemented Methods

Agile Iteration Process for Data Mining

Figure 4:
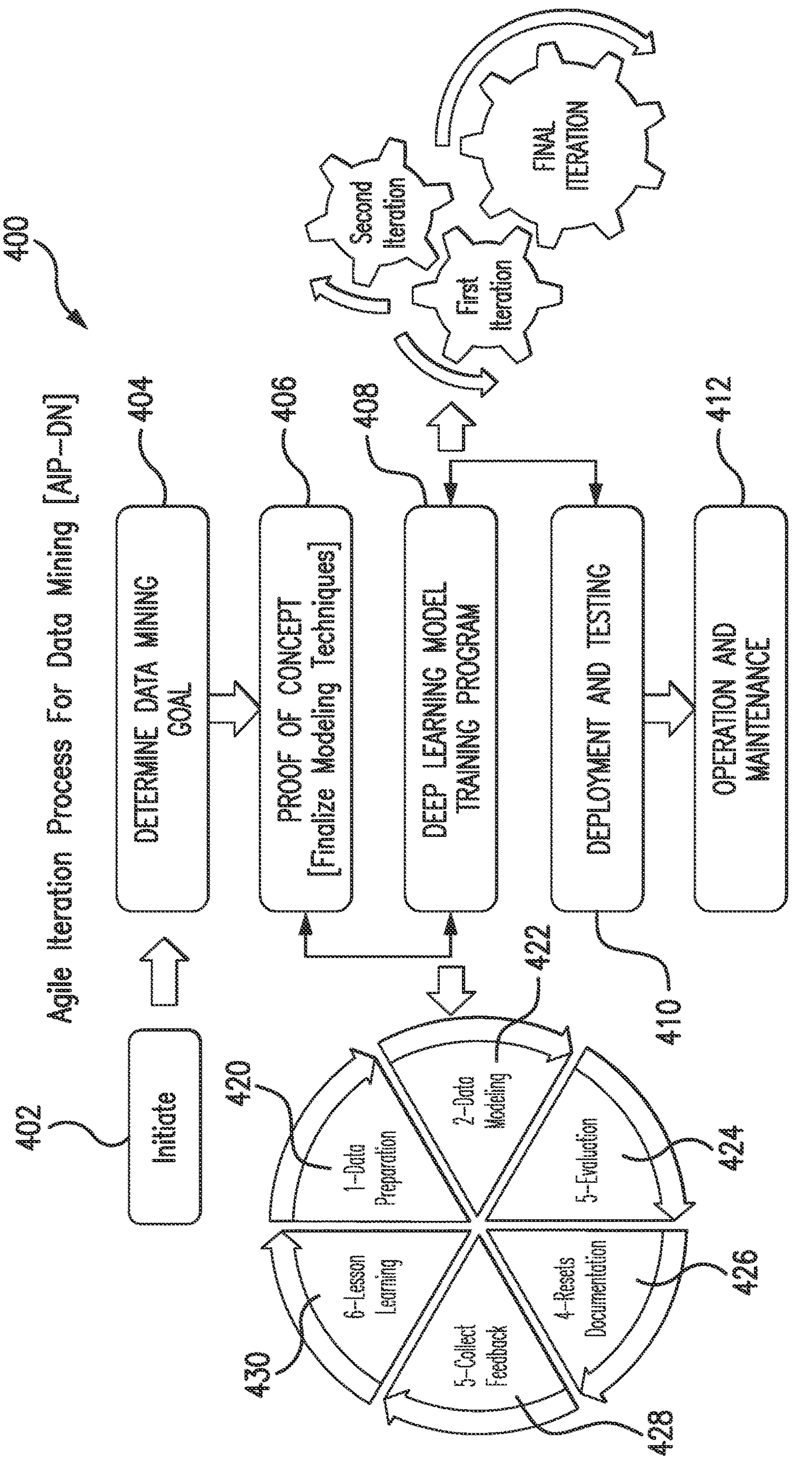
FIG. 4 is a flowchart illustrating an exemplary computer-implemented process for an automatic agile iteration process for data mining ("AIP-DM") process model, in accordance with one embodiment of the present disclosure.

FIG. 4 is a flowchart illustrating an exemplary computer-implemented process 400 for an automatic agile iteration process for a data mining ("AIP-DM") process model, in accordance with one embodiment of the present disclosure. The operations described herein may be performed in the order shown in FIG. 4 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented process 400 is described below, for ease of reference, as being executed by exemplary devices and components introduced with the embodiments illustrated in FIGS. 1-4. In one embodiment, the computer-implemented process 400 is implemented by the server 10. While operations within the computer-implemented process 400 are described below regarding the server 10, according to some aspects of the present invention, the computer-implemented process 400 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

The phrase "data mining," as referenced herein, includes the process of extracting and discovering patterns in large data sets via the use of techniques at the intersection of machine learning, statistics, and database systems. Data mining is a process that facilitates turning raw data into useful information. The term "agile" includes continuous incremental improvement through small and frequent steps or releases. Agile practices include requirements discovery and solutions improvement through the collaborative effort of self-organizing and cross-functional teams with customer(s)/end user(s), adaptive planning, evolutionary development, early delivery, continual improvement, and flexible responses to changes in requirements, capacity, and understanding of the problems to be solved.

Process models are processes of the same nature that are classified together into a model. A data mining process model is an abstraction of the data science model development process. The models specify the stages and order of a process. The AIP-DM process model conceptualizes data science as an incremental process model. However, while the incremental process model focuses on iterative progress, the AIP-DM process model does not always flow in a single direction. For example, each step of the process may cause the process to revert back to any previous step, and in some examples, the steps can be run in parallel.

In the exemplary embodiment, the process 400 is initiated at step 402. For example, the process 400 is initiated with a business requirements understanding, including defining a business goal. This is the initial phase of any of the business projects where deep understanding and knowledge of a customer's needs is of primary importance. At initiation, the business goal is defined. Inputs to the business goal definition include, without limitation, a minimum viable data product (MVDP) scope (i.e., what to solve from a business perspective), a product scope (i.e., what the customer wants and definition of business success criteria), and a data mining scope (i.e., definition of the technical data mining success criteria). In an example use case involving transaction classification and entity resolution, as described herein, the business goal may be defined as the following: "to extract important entities and preform classification for a given transaction in the form of business categories."

At step 404, the process determines the data mining goal, for example, for the business goal or objective. For example, at this step, data gathering and understanding is performed, training data is sourced, and the data is analyzed to verify data quality. For example, specific inputs may include, without limitation, an initial data collection report (i.e., details about data sources and locations of data), a data description report (i.e., a description of the data must be prepared), and a data exploration report (i.e., answer any queries and questions related to the data mining process). In the example use case described above, the data mining goal may be defined as the following: i) categorize the transaction data based on the text at a granular level, and ii) extract and standardize the transaction entity from the given transaction dataset in the form of business, payment, and platform.

In step 406, one or more proof of concept (PoC) models are defined. Experimentation and innovation can take a company's data to the next level. However, the implementation of a new data science project may seem uncertain and even risky to some businesses. No business wants to waste resources and time, particularly for its first business data artificial intelligence (AI) project. Thus, the AIP-DM process includes a PoC step.

PoC is used before the launch of a product into the market and before the initiation of product development. PoC outlines technologies for a solution and explores the project's possible risks and potential technical issues. PoC is intended for analysis of the potential market demand for the product, whereas MVDP is created with the primary goal for analyzing how customers react to the solution.

The PoC step assesses the value, relevance, and/or feasibility of a proposed solution or idea before it is implemented. PoC involves a step-by-step process, beginning with lightweight, simple experiments that exhibit tangible results. Consequently, the organization can learn and understand the value provided by the data science PoC activity. As the organization gains confidence and assurance, it can proceed with implementation.

The PoC step is part of the agile iteration process, wherein a roadmap is initially defined for finalizing a model that meets the business or project objective. It is during the PoC iteration process that the modeling techniques are finalized. In one embodiment, various statistical measures are generated from the input data to determine which data mining model should be built, trained, and tested, which transformations should be performed, and which adjustments should be made, if any, to the model creation parameters based on the input data statistics. The inputs to the PoC process include, without limitation, the business goal, the data mining goal, and a sample labelled dataset for training/testing. The outputs from the PoC process include, without limitation, concept validation, a finalized modelling technical approach for data mining, and timelines for model creation, training, evaluation, and deployment. In the example use case described above, data scientists validated that two (2) models, DistilBert (a distilled parameter model) and Roberta (high parameter in comparison to another), meet the requirements for transaction classification. In addition, the data scientists validated that the BERT token classification model meets the requirement of extraction and standardization of entities from a given dataset in the form of business, payment, and platform.

Step 408 is a deep learning model training program. In step 408, a PoC model is selected and iteratively trained. In data science, an agile iteration is a short period of time during which a section of work is developed and tested. Agile iteration is the essential element to the extraction, visualization, and productization of insight. The iterative focus on continual improvement pushes data scientists to work with domain experts and with stakeholders to improve the models by following the iterative steps involved in the deep learning model training program step, described below. At least two (2) more iterations may be needed to build a good model engine and ensure that the model is trained and tested correctly. However, it is noted that the deep learning model training program may be iteratively performed any number of times.

Each iteration includes a number of operations to inform whether the model is ready to proceed to the next step of the process 400. During an example iteration, the deep learning model training program performs data preparation at step 420. More particularly, a dataset is selected for the data preparation (e.g., labelling) activity, which produces any viable result. The dataset is cleaned and scrubbed of any extraneous, unneeded, or irrelevant data. For example, the data preparation may include discretization of continuous attributes, outlier handling, normalization of continuous attributes, missing values treatment for continuous and categorical attributes, and/or randomized sampling of input data to use in building and testing the model.

In step 422 of the iteration process, the data mining model is built using the prepared input data and/or a sampling of the input data. The statistics that were generated on the input data are used to adjust model creation parameters. The machine learning data mining model is developed to answer the business question described above.

In step 424, the generated model is evaluated. In particular, this step evaluates the model concerning the business indicator and what needs to be done next, if anything, to finalize or refine the model. The results of the model training are documented at step 426. In particular, step 426 is where the data scientists may explain how the machine learning model would help the business. In step 428, the iteration results may be shared with the business and feedback is collected. The feedback is collected and analyzed by a subject matter expert(s). This step is important to ensure that the business and the data scientists team are aligned with the business and data mining goals.

At step 430, lesson and learning documentation is generated and used to inform the next iteration, the PoC step 406, and/or the deployment and testing step 410. For example, the findings are summarized, and corrections made to the model/model training, if needed.

The inputs to step 408 include, without limitation, finalized modelling technical approaches for data mining, defined in step 406. The output after iterative training includes a trained deep learning model.

At step 410, the trained model is deployed and tested. The model may be deployed or launched in several ways. A common method includes releasing the trained deep learning model into production by building an application programming interface (API). The API can build on the development environment and be deployed on stage and in the production environment.

The model must not only predict correctly but do so because the model is algorithmically correct. In software development, the ideal workflow follows test-driven development (TDD). However, in ML, starting with tests is not straightforward. The tests depend on the data, the model, and the problem. For example, before training a model, a test to validate the loss cannot be defined. Rather, the achievable loss is discovered during model development. A new model version is then built and tested against the achievable loss.

Testing criteria for the trained deep learning model includes, without limitation, the following: i) validating input data schema; ii) validating quality of iterative versions; iii) validating serving infrastructure; and iv) testing integration between pipeline components. The inputs to the development and testing process include, for example, the trained ML or deep learning model, availability of the deployment structure; and a sample labelled dataset for testing. The outputs include, without limitation, the following: a performance testing report; a deployment plan (i.e., the manner in which the model is deployed; the manner in which the result is presented or delivered; plan and document the process); a monitoring and maintenance plan (i.e., identify what is included in the monitoring and maintenance plan; monitoring the result and maintaining the model quality is as important as any other phase; the businesses do not want the models to become a burden); and a final report (i.e., conclude the project by creating a summary report and a presentation).

In the example embodiment, steps 406, 408, and 410 may be iteratively performed to determine an optimal model that meets the business or project objective. For example, an iterative process can happen between the PoC step 406 and the deep learning model training program step 408. The number of iterations between these steps may be dependent on a required quality of the machine learning model before the model is deployed into the production environment. The training of a PoC model at step 408 is fed back to step 406, wherein a different modeling technique may be selected and trained. Likewise, an iterative process can happen between the deployment and testing step 410 and the deep learning model training program step 408. The number of iterations between these steps may be dependent on a required quality of the machine learning model before the model is deployed into the production environment. The deployment and testing at step 410 is fed back to the training step 408, wherein additional training may be performed at step 408 or a different modeling technique may be selected at step 406.

After the modeling technique is finalized and tested, the model is released for production at the operation and maintenance step 412. Regular model maintenance is critical for managing successful AI models—even after the models are deployed. Maintenance is an ongoing activity where the team can improve, optimize, and/or maintain model performance; train the model on additional labelled data sets to improve model accuracy; add new patterns or features that helps to maintain model performance and consistence, etc. In this step, the team works towards the maturity of the model or product.

The AIP-DM process model facilitates resolving the typical challenges, concerns, and limitations with existing process models and helps development teams to improve their performance effectively and efficiently. Advantageously, the AIP-DM process model empowers stakeholders and team members, builds accountability, encourages diversity of ideas, allows the early release of benefits, and promotes continuous improvement. This improves efficiency by saving significant time on the process side (specifically people management) and improving the quality of work.

The process 400 may include additional, less, or alternate actions, including those discussed elsewhere herein such as in the section entitled "Exemplary System," and/or may be implemented via a computer system, communication network, one or more processors or servers, and/or computer-executable instructions stored on non-transitory storage media or computer readable medium.

Data Integration with Taxpayer Identification Number

Figure 5:
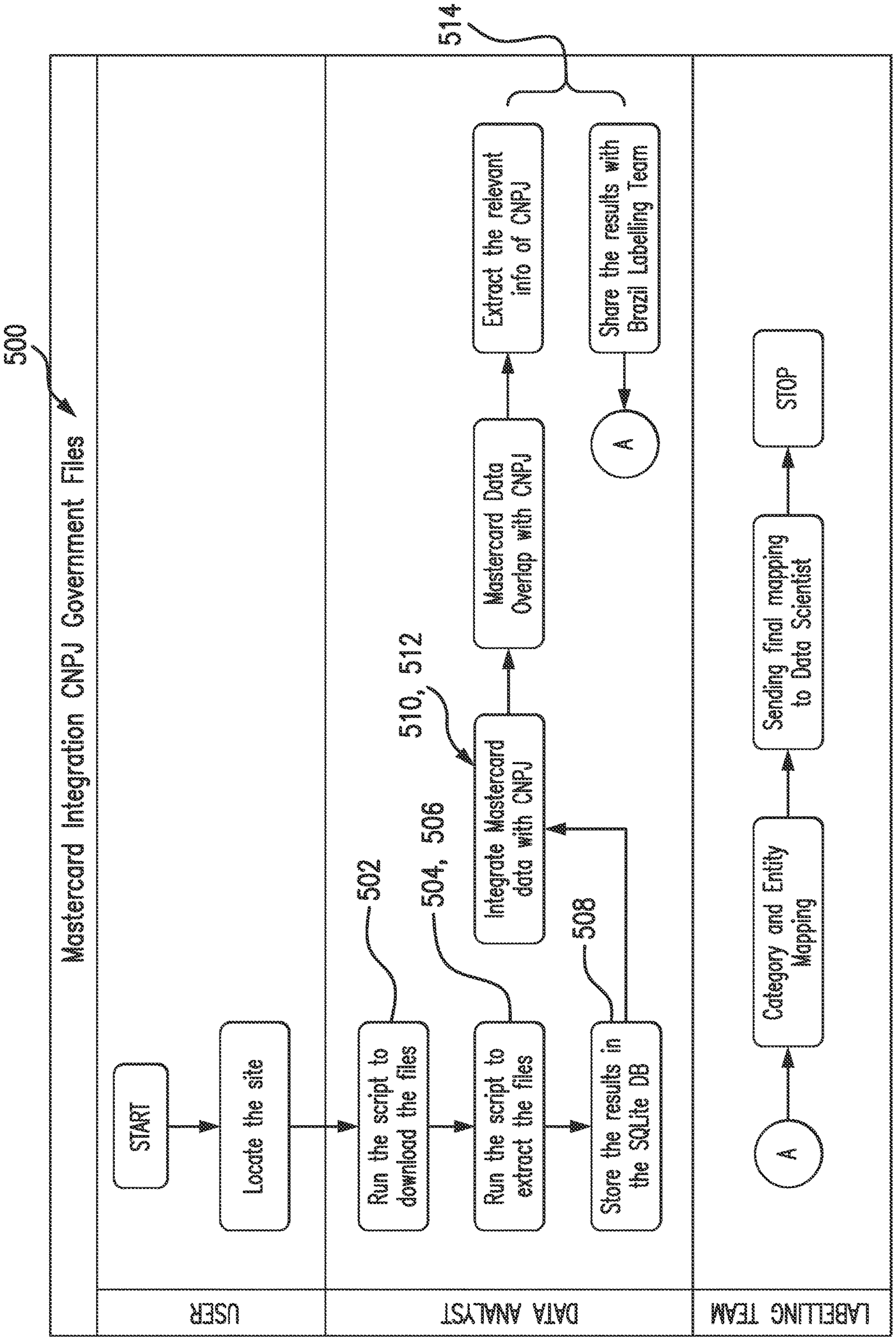
FIG. 5 is a flowchart illustrating an exemplary computer-implemented method for integrating public source data with customer data based on a taxpayer identification number, in accordance with one embodiment of the present disclosure.

FIG. 5 is a flowchart illustrating an exemplary computer-implemented method 500 for integrating public source data with customer data based on a taxpayer identification number, in accordance with one embodiment of the present disclosure. The operations described herein may be performed in the order shown in FIG. 5 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 500 is described below, for ease of reference, as being executed by exemplary devices and components introduced with the embodiments illustrated in FIGS. 1-4. In one embodiment, the computer-implemented method 500 is implemented by the server 10. While operations within the computer-implemented method 500 are described below regarding the server 10, according to some aspects of the present invention, the computer-implemented method 500 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the example method 500, using a taxpayer identification number to integrate government source data, for example, with customer data, facilitates generating one or more classification and entity resolution lookup tables. Furthermore, the source data (e.g., government source data) contains information on entities that can be used to improve the quality of datasets used to train certain models which, in turn, reduces manual effort by a mapping/labeling team and increases the efficiency of these models.

The method 500 is directed to the use of one or more automated scripting tools that extract selected data (e.g., government source data, entity details data, entity reference data, entity cross-reference data, etc.) from one or more tables of the source data, format the extracted data into a selected format, store the formatted data to the database 28, and, optionally, log the time/completion of the process steps.

In the example, the method 500 will be described with respect to entity data available for businesses registered to operate in Brazil. It is noted that the steps described herein may be broadly applicable to integrating two or more data sources based on a common entity identifier.

In the example, it is noted that all businesses that are formed in Brazil are required (by law) to apply for a Cadastro Nacional da Pessoa Juridica ("CNPJ"), or "National Registry of Legal Entities" number at the time of formation. Foreign companies that wish to invest or own assets in Brazil must also have a CNPJ number. The CNPJ number is a fourteen (14) digit number. The CNPJ number is formatted as follows: XX.XXX.XXX/0001-XX. The first eight digits identify the company, the four digits after the slash identify the branch or subsidiary (e.g., "0001" defaults to the business's headquarters), and the last two digits are check digits. The CNPJ number is a taxpayer identification number. The CNPJ number is used at a business level (not by individuals). The Brazilian government maintains and provides a plurality of datasets associated with the CNPJ public data.

At operation 502, an Python script is executed (i.e., runs) on the server 10 at a predetermined interval/frequency to download the one or more taxpayer identification number datasets, for example, from an external data source. For example, a Get CNPJ Data Python script can be run to retrieve the download links for the datasets from the Brazilian government Open CNPJ Data website. In one embodiment, the Get CNPJ Data Python script retrieves all the available downloads links and downloads about thirty-eight (38) compressed data files of CNPJ data from an indexed view webpage of the Brazilian government (e.g., from the following link: https://www.gov.br/receitafederal/pt-br/assuntos/orientacao-tributaria/cadastros/consultas/dados-publicos-cnpj).

At operation 504, the Python script creates a storage folder and copies or moves all the compressed data files to this storage folder for further processing. Furthermore, the Python script also creates a target folder for the data extraction and database file generation.

At operation 506, a second Python script is executed (i.e., run) on the server 10 to extract the CNPJ data from the plurality of compressed data files to the target folder. After extracting the CNPJ data from the compressed data files, at operation 508, the second Python script creates a new database or table (e.g., a CNPJ database or table) in the target folder. Table 1 depicts an example CNPJ table layout generated at operation 508.

TABLE 1

| # | Source File Name | Column Name (Portuguese) | Definition | Final Column Name |
|---|---|---|---|---|
| 1 | estabelecimento.csv | cnpj_basico, cnpj_ordem, cnpj_dv | 14-digit number generated by combining three columns (i.e., cnpj_basico, cnpj_ordem, cnpj_dv) from the "estabelecimento" csv files) | CNPJ_TaxID |
| 2 | estabelecimento.csv | nome_fantasia | Trademark name of the merchant from column "nome_fantasia" from the "estabelecimento" csv files | trade_name |
| 3 | empresas.csv | razao_social | Legal Corporate name of the merchant; A text column "razao_social" from the "empresas" csv file. | corporate_name |
| 4 | cnae.csv | cane_descricao | National Classification of Economic Activities or CNAE is a tax code categorization from that the 'cnae" csv files | tax_code_category |
| 5 | natureza_juridica.csv | natureza_juridica_descricao | classifies a business as Individual/Standalone or Platfrom, this is a text column "natureza_juridica_descricao" from the "natureza_juridica" csv files | legal_nature |
| 6 | estabelecimento.csv | situacao_cadastral | Flags a company's status as Active or inactive | business_status |
| 7 | motivo.csv | motivo_descricao | Reason for companies' status in inactive state | business_status_reason |
| 8 | municipio.csv | State | municipip_descricao | State |
| 9 | pais.csv | Country | pais_descricao | Country |

At operation 510, the method 500 includes assigning the CNPJ_TaxID field a primary key. It is noted that, in the example, the cnpj_basico, cnpj_ordem, and cnpj_dv columns of the CNPJ database are used to create the CNPJ_TaxID field in the final column. Typically, the rows or entries of data stored in tables, for example, the CNPJ table (e.g., a referenced table), are associated with an identifier for easier access and identification. The identifier assigned to a data value or set of data values may be unique to the associated data with respect to other identifiers used for the other data stored in the table. As used herein, such an identifier is referred to as a "primary key."

At operation 512, the method 500 includes assigning a tax ID entry of the customer data (e.g., Mastercard® transaction data table, customer transaction data table, etc.) a foreign key. The rows or entries of data stored in, for example, the Mastercard® transaction data table (e.g., a referencing table), are associated with an identifier that may reference the associated data in the CNPJ table. Such an identifier is referred to as a "foreign key" in the Mastercard transaction data table. The foreign key is a field in the Mastercard transaction data table that is the primary key in the CNPJ table. As such, the data in the Mastercard transaction data table references specific entity data entries associated with the CNPJ_TaxID entry in the CNPJ table. For example, using the Tax ID field in the Mastercard transaction data table, a trade name and corporate name for an entity can be retrieved from the CNPJ table.

Optionally, at operation 514, the CNPJ data and/or relevant entity data may be extracted from the integrated customer data table and CNPJ table, and provided to a labelling team, which may prepare the data for further processing.

The method described above provides techniques that parse and arrange a vast array of disparate datasets into a standard format (e.g., raw, unstructured data, semi-structured data, or data stored in one or more differing schema) and utilize the prepared data to generate a database that can be integrated with an existing customer database for further processing by using one or more special-purpose artificial intelligence (AI) data models.

The method 500 may include additional, less, or alternate actions, including those discussed elsewhere herein such as in the section entitled "Exemplary System," and/or may be implemented via a computer system, communication network, one or more processors or servers, and/or computer-executable instructions stored on non-transitory storage media or computer readable medium.

Transaction Classification Model

Figure 6:
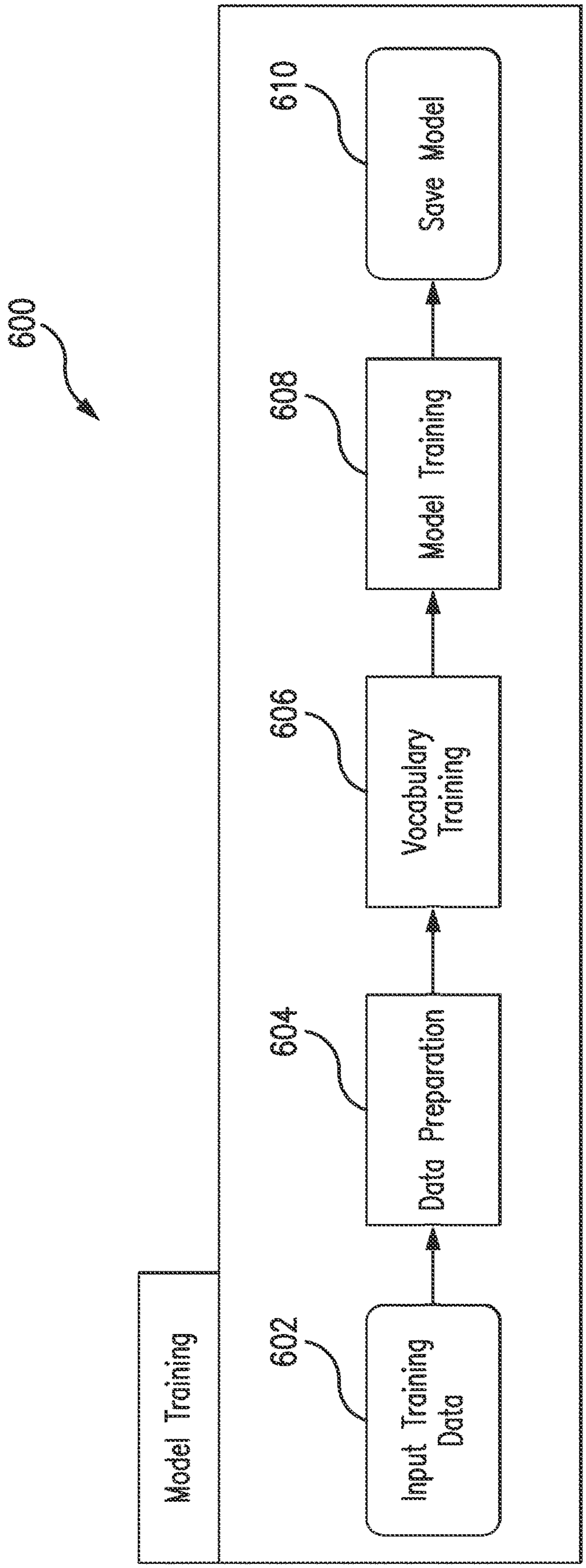
FIG. 6 is a flowchart illustrating an exemplary computer-implemented method of model training for improving the classification of open banking transactions with artificial intelligence, in accordance with one embodiment of the present disclosure.

FIG. 6 is a flowchart illustrating an exemplary computer-implemented method 600 of model training for improving the categorization and classification of open banking transactions with artificial intelligence, in accordance with one embodiment of the present disclosure. The operations described herein may be performed in the order shown in FIG. 6 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 600 is described below, for ease of reference, as being executed by exemplary devices and components introduced with the embodiments illustrated in FIGS. 1-4. In one embodiment, the computer-implemented method 600 is implemented by the server 10. While operations within the computer-implemented method 600 are described below regarding the server 10, according to some aspects of the present invention, the computer-implemented method 600 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

The model is trained to execute various techniques for analyzing data (e.g., financial transaction data) to identify patterns and solve problems that humans cannot possibly identify or solve. Machine learning (ML) and/or AI techniques have been developed that allow parametric or non-parametric statistical analysis of large quantities of data (e.g., Big Data). Such machine learning techniques may be used to automatically identify relevant variables (i.e., variables having statistical significance or a sufficient degree of explanatory power) from various datasets. This may include identifying relevant variables or estimating the effect of such variables that indicate actual observations in the dataset. This may also include identifying latent variables not directly observed in the data, such as variables inferred from the observed data points. In some embodiments, the methods and systems described herein may use AI and/or ML techniques to identify and estimate the effects of observed or latent variables such as transaction category, merchant category, and the like, or other such variables that influence the classification of a transaction.

Use of the AI and/or ML techniques described herein, may begin with training a machine learning program (broadly, a model). The model(s) may be trained using supervised or unsupervised machine learning, and the AI/ML model(s) may employ a neural network, which may be a convolutional neural network, a deep learning neural network, a combined learning module or program, and the like, that learns in two or more fields or areas of interest. Additionally or alternatively, the AI/ML model(s) may be trained by inputting sample datasets or certain data into the model(s) (e.g., transactions, merchants, etc. as described herein). The machine learning programs may utilize deep learning algorithms that may be primarily focused on pattern recognition and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, the example AI/ML model(s) may be provided with labeled example inputs and their associated outputs and the model(s) may seek to discover a general rule that maps inputs to outputs, so that when subsequent novel inputs are provided to the model(s), based upon the discovered rule, the model(s) may accurately determine a correct output. In unsupervised machine learning, the AI/ML model(s) may be required to find their own structure in unlabeled example inputs.

In one embodiment, one or more AI/ML model(s) may be trained by providing the model(s) with a large sample of initial and/or historical transaction data with known characteristics or features (i.e., labels). Such information may be used to determine an initial transaction taxonomy for the transactions. The transaction taxonomy may be updated or revised with one or more new transaction categories to define a new revised transaction taxonomy from time to time. Accordingly, the transaction taxonomy may be referred to as a dynamic taxonomy. Herein, the term "dynamic," as it relates to the transaction taxonomy, indicates that the structure and/or included transaction categories of the transaction taxonomy may change based on analysis of the submitted data.

Based upon the above-described analyses, the AI/ML model(s) may learn how to identify characteristics and patterns that may be applied to analyzing newly submitted transaction data. For example, the AI/ML model(s) may learn how to identify different types of transactions (for categorization) based upon differences in the transaction data.

Accordingly, in the example method 600, at step 602, raw training data is input to the selected classification model (i.e., a classification neural network) to be trained. For example, in one embodiment, the server 10 may retrieve the raw training data from the database 28 (shown in FIG. 1) and/or may receive the raw training data from one or more of the data source computing devices 14 (shown in FIG. 1). As discussed above, the raw training data includes labelled historical transaction data, which comprises a plurality of individual transactions.

At step 604, the raw training data is prepared for use in classification model training during a data preparation process. During the data preparation process, trailing special characters are removed if the special characters occur more than once, any trailing digits are removed, and any accent words are removed. An example of the data preparation process includes the following: i) transaction data is "***df purchase dominos pizza0234", ii) remove repeating special characters, any digits, and any accent words, iii) resultant transaction data is "df purchase dominos pizza". As described herein, the raw training data include financial transaction data. Thus, the data preparation step is performed for each transaction included in the dataset. The result is processed training data ready for use in training the model(s).

At step 606, vocabulary training is performed on the processed training data. That is, the process may tokenize the text and convert it to a model specific format. In particular, a BERTWordPieceTokenizer is used for vocabulary training. Generally, tokenization via BERTWordPieceTokenizer is a tokenization technique between word and character-based tokenization (i.e., subword-based tokenization). A BERTWordPieceTokenizer does not split the frequently used words into smaller subwords. Rather, BERTWordPieceTokenizer splits the rare words into smaller meaningful subwords. For example, using BERTWordPieceTokenizer, "boy" is not split but "boys" is split into "boy" and "s." This allows the model to learn that the word "boys" is formed using the word "boy" with slightly different meanings but the same root word.

Figure 7:
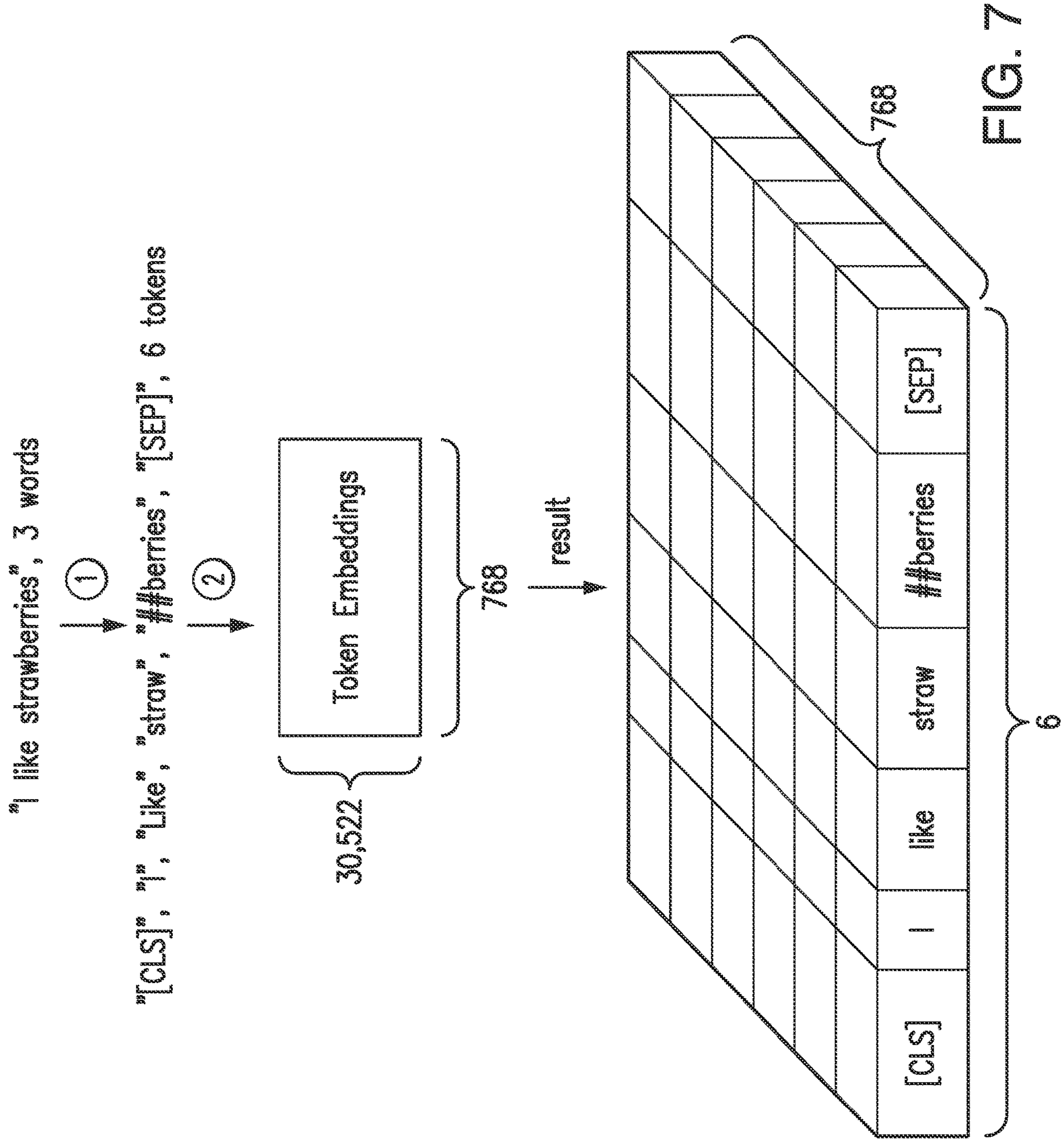
FIG. 7 is an example of a BERTWordPieceTokenizer process where text is tokenized and converted to numbers.

FIG. 7 is an example of a BERTWordPieceTokenizer process where text is tokenized and converted to numbers, which can be analyzed by the model. The vocabulary is initialized with individual characters in the text. The most frequent combinations of symbols in the vocabulary are iteratively added to the vocabulary. More particularly, the BERTWordPieceTokenizer process includes the following operations: i) initializing the word unit inventory with all the characters in the text; ii) building a language model on the training data using the word unit inventory; iii) generating a new word unit by combining two units out of the current word inventory to increment the word unit inventory by one (the process chooses the new word unit out of all the possible ones that increases the likelihood on the training data the most when added to the model); and iv) repeats steps ii) and iii) until a predefined limit of word units is reached or the likelihood increase falls below a predetermined threshold.

In the example depicted in FIG. 7, a [CLS] token is used to indicate "classification." The [CLS] token is added at the beginning of the sentence because the training task being performed is sentence classification and the training process needs an input that can represent the meaning of the entire sentence. The training process cannot take any other word from the input sequence because the output of that is the word representation. As such, the training process adds the [CLS] token, which has no other purpose than being a sentence-level representation for classification. The tokenized text from step 606 may be in a specific format used by a particular transformer algorithm, such as a DistilBert and Roberta model.

At step 608, the classification model is trained, for example, using a transformer model. In the example, the transformer model includes a DistilBert transformer model. In embodiments, default parameters may be used, or may be specifically selected. As discussed above, the [CLS] token is used for representation of the sentence. During training, a determination is made whether training criteria are met. The training criteria may be a metric, such as a metric indicating a target loss accuracy, depth for recall at a specified percentage, an F1 measure, and the like. If the training criteria are met, at step 610 the classification model is stored, for example, on the database 28 of the server 10. In particular, the model weights, label dictionary, and the trained tokenizer weights are stored in the database 28.

The method 600 may include additional, less, or alternate actions, including those discussed elsewhere herein such as in the section entitled "Exemplary System," and/or may be implemented via a computer system, communication network, one or more processors or servers, and/or computer-executable instructions stored on non-transitory storage media or computer readable medium.

Figure 8:
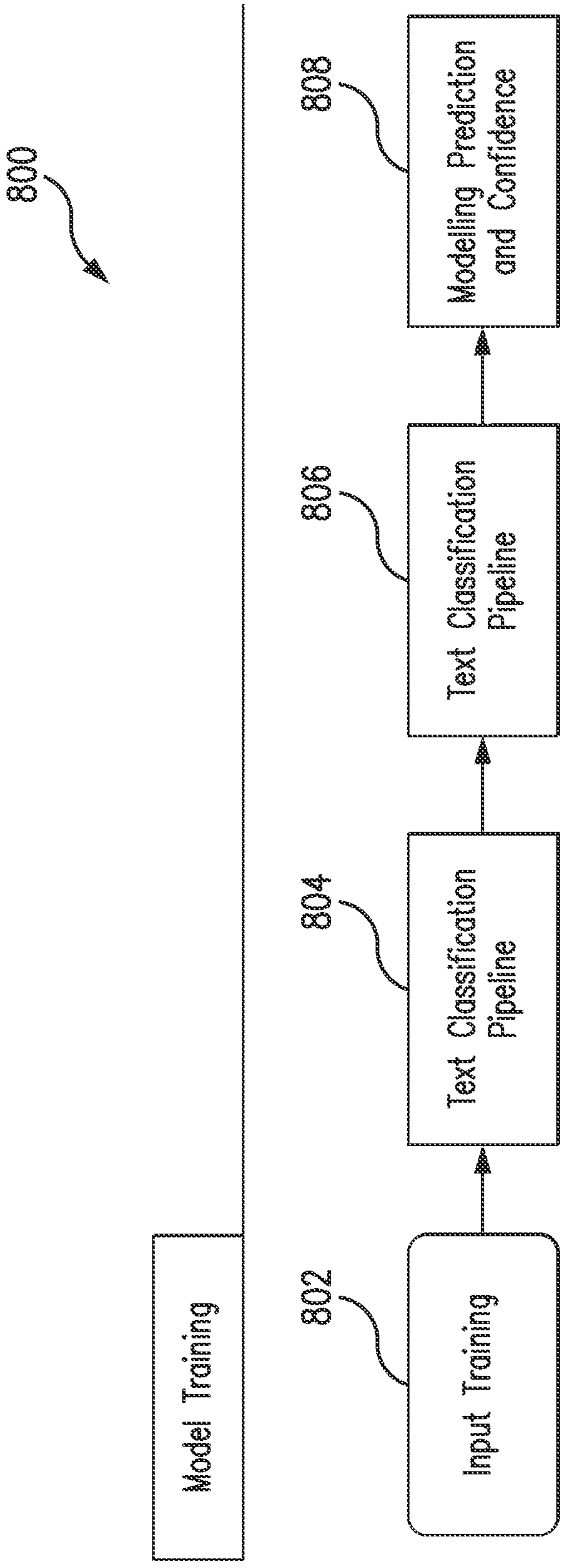
FIG. 8 is a flowchart illustrating an exemplary computer-implemented method of testing the classification model for improving the classification of open banking transactions with artificial intelligence, in accordance with one embodiment of the present disclosure.

FIG. 8 is a flowchart illustrating an exemplary computer-implemented method 800 of testing the classification model for improving the classification of open banking transactions with artificial intelligence, in accordance with one embodiment of the present disclosure. The operations described herein may be performed in the order shown in FIG. 8 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 800 is described below, for ease of reference, as being executed by exemplary devices and components introduced with the embodiments illustrated in FIGS. 1-4. In one embodiment, the computer-implemented method 800 is implemented by the server 10. While operations within the computer-implemented method 800 are described below regarding the server 10, according to some aspects of the present invention, the computer-implemented method 800 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At step 802, raw data (e.g., testing data, sample customer data, etc.) is input to the trained classification model (described above in method 600). At step 804, the raw data is prepared for use during a data preparation process. During the data preparation process, trailing special characters are removed if the special characters occur more than once, any trailing digits are removed, and any accent words are removed. As described herein, the raw data may include financial transaction data. Thus, the data preparation step is performed for each transaction included in the dataset. The result is processed data ready for use in trained classification the model(s).

At step 806, the processed data is used by the classification model in a text classification pipeline. The text classification pipeline includes the tokenizer process, the trained model analysis process, and a decoding process. The tokenizer process receives the raw data and is used for sentence tokenization of the data. The trained model analysis process, which includes the learned parameters and model configuration, receives the tokenized data and generates one or more weighted outputs for each sentence (or transaction) included in the raw data. Using the weighted sentence output, the defined dictionary is referenced to determine a classification/label for the respective sentence.

At step 808, the classification model outputs a classification prediction and a classification confidence score for each of the sentences or transactions contained in the raw data. In an example, the classification confidence score corresponds to the highest weighted output for the respective sentence, and the classification prediction corresponds to the dictionary label associated with the highest weighted output for the respective sentence.

The method 800 may include additional, less, or alternate actions, including those discussed elsewhere herein such as in the section entitled "Exemplary System," and/or may be implemented via a computer system, communication network, one or more processors or servers, and/or computer-executable instructions stored on non-transitory storage media or computer readable medium.

Entity Resolution and Standardization Model

Figure 9:
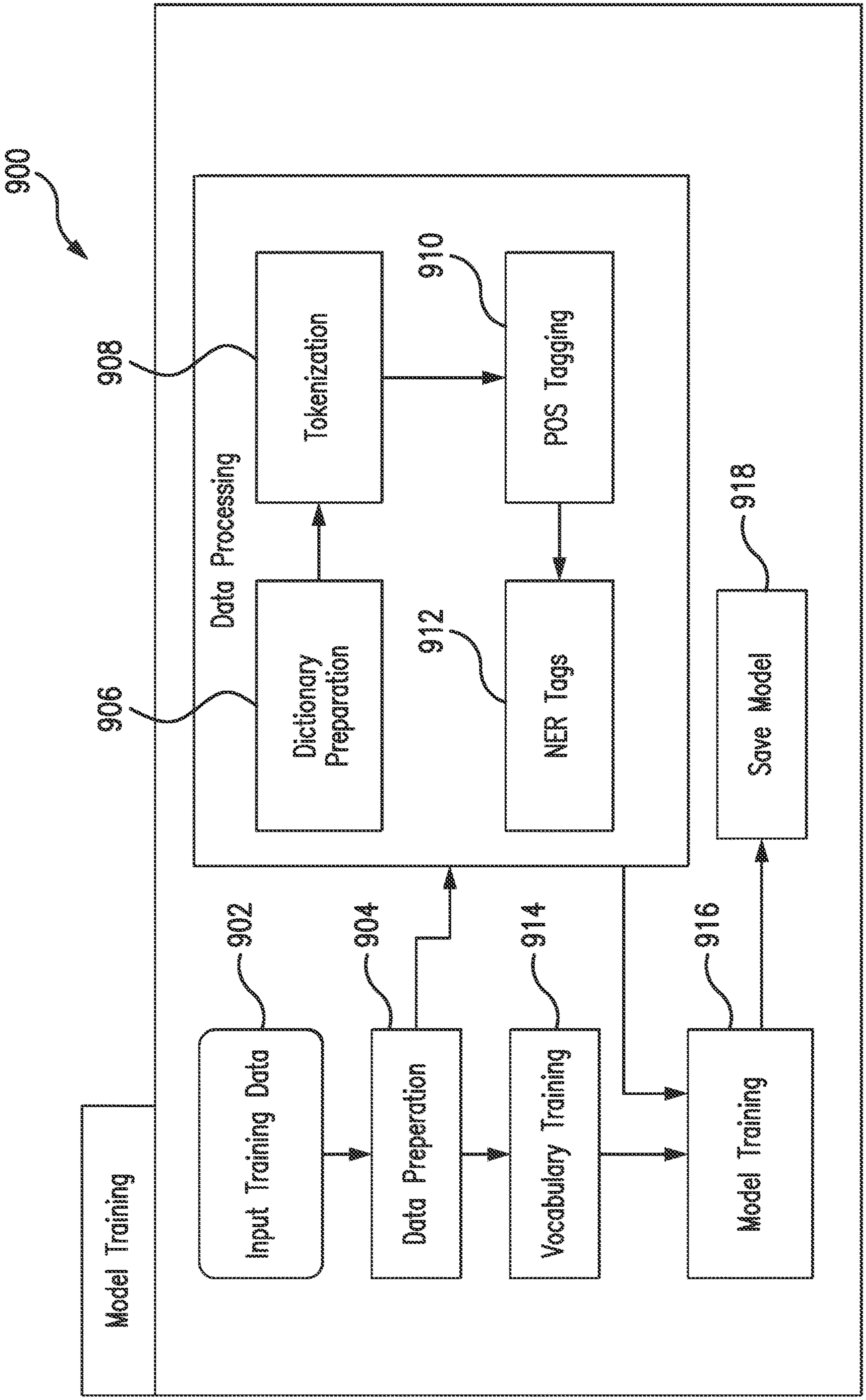
FIG. 9 is a flowchart illustrating an exemplary computer-implemented method of model training for improving entity resolution of open banking transactions with artificial intelligence, in accordance with one embodiment of the present disclosure.

FIG. 9 is a flowchart illustrating an exemplary computer-implemented method 900 of model training for improving entity resolution of open banking transactions with artificial intelligence, in accordance with one embodiment of the present disclosure. The operations described herein may be performed in the order shown in FIG. 9 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 900 is described below, for ease of reference, as being executed by exemplary devices and components introduced with the embodiments illustrated in FIGS. 1-4. In one embodiment, the computer-implemented method 900 is implemented by the server 10. While operations within the computer-implemented method 900 are described below regarding the server 10, according to some aspects of the present invention, the computer-implemented method 900 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At step 902, raw training data is input to the entity resolution model (i.e., an entity resolution neural network) to be trained. For example, in one embodiment, the server 10 may retrieve the raw training data from the database 28 (shown in FIG. 1) and/or may receive the raw training data from one or more of the data source computing devices 14 (shown in FIG. 1). As discussed above, the raw training data includes labelled historical transaction data, which comprises a plurality of individual transactions.

At step 904, the raw training data is prepared for use in the entity resolution model training during a data preparation process. Multiple data processing operations are performed during the data preparation process. In particular, the data preparation process includes the operations described above with reference to step 604 of method 600. As described herein, the raw training data includes financial transaction data. Thus, the data preparation step is performed for each transaction included in the dataset. The result is processed training data.

In addition, during the data preparation process, at step 906, a dictionary is generated. Furthermore, the method 900 is configured to generate tagged data from the raw training data. Tagged data refers to the data being tagged as either "Business" or "Other." The tagged data serves as an input to the entity resolution model. The inputs for the tagging operations include the raw training data and the dictionary created at step 906. The tagging process is a multi-process technique that includes word tokenization at step 908 (using, for example, a NLTK Whitespace Tokenizer model), part of speech tagging at step 910, and name entity recognition (NER) tagging at step 912.

At step 914, vocabulary training is performed on the raw training data. That is, the process may tokenize the text and convert it to a model specific format. In particular, BERT-WordPieceTokenizer is used for vocabulary training, as described above with reference to step 606 of method 600. Refer to step 606 for the specific details of the vocabulary training.

At step 916, the entity resolution model is trained, for example, using a transformer model. The inputs to the entity resolution model include the vocabulary defined at step 914 and the tagged data generated by the data preparation processes (i.e., steps 906, 908, 910, and 912). In the example, the transformer model includes a Bert transformer model. In embodiments, default parameters may be used, or may be specifically selected. As discussed above, the [CLS] token is used for representation of the sentence structure of the data. During training, a determination is made whether training criteria are met. The training criteria may be a metric, such as a metric indicating a target loss accuracy, depth for recall at a specified percentage, an F1 measure, and the like. If the training criteria are met, at step 918 the entity resolution model is stored, for example, on the database 28 of the server 10. In particular, model weights and the label dictionary of tokens are stored in the database 28.

The method 900 may include additional, less, or alternate actions, including those discussed elsewhere herein such as in the section entitled "Exemplary System," and/or may be implemented via a computer system, communication network, one or more processors or servers, and/or computer-executable instructions stored on non-transitory storage media or computer readable medium.

The phrase "word tokenization," as used herein includes a process of splitting large sentences or transactions of text into individual words, including defining a token for each word. The phrase "text lemmatization" and like terms, as used herein, include doing things properly with the use of a vocabulary and structural analysis of words, aiming to remove inflectional endings only and to return the base or dictionary form of a word, which is known as the lemma. As described above, stop words are available in large quantity in the transaction data. By removing these stop words, the low-level information is removed from the transaction data to enable focus/attention to the important information. Similarly, punctuations are removed from the transaction because the punctuations affect the results of the model analysis, especially what depends on the occurrence frequency of words and phrases. Furthermore, the dictionary creation process 1000 includes converting accented characters or words by converting the characters to ASCII.

The dictionary creation process may result in creation of the dictionary, tokenization, and POS tagging up to three (3) types of entities: business name, payment method/type, and payment platform. Table 2 below depicts example entities that may be defined during the dictionary creation process.

TABLE 2

| | |
|---|---|
| BUSINESS NAME | ["WALMART", "WAL MT", "WL MT", "AMAZON", AMZN"] |
| PAYMENT METHOD/TYPE | ["DEBIT CARD", "CREDIT CARD", "BILL PAY", "ATM", "POS", "WIRE", "P2P", CHECK", "ECHECK"] |
| PAYMENT PLATFORM | ["PAYPAL", "GPAY", "FBPAY", "QUICKPAY", "GUSTO", STRIPE", "ADP", "ZELLE", "SEL", "VENMO", "FISERV"] |

Figure 10:
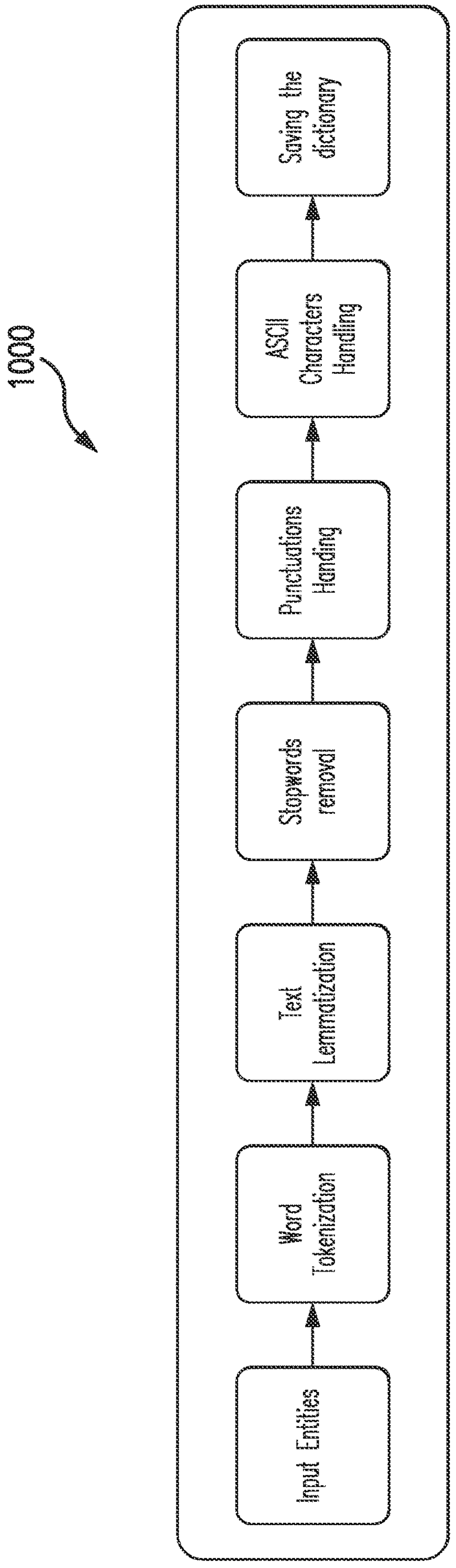
FIG. 10 depicts a flow diagram for the dictionary creation process of the computer-implemented method of FIG. 9.

FIG. 10 depicts a flow diagram for the dictionary creation process 1000 described above at step 906. The server 10 includes an automatic engine configured to create the dictionary. The automatic engine performs natural language processing on the raw training data by scanning the text and generating one or more word tokens, as described below. The input data to the automatic engine includes the labelled raw training data, which includes the business names of the entities performing the transactions.

As depicted in FIG. 10, the raw training data is input into the entity resolution model. In a non-limiting example, part of the natural language processing may be performed using Natural Language Toolkit (NLTK). NLTK is a Python-based Natural Language Processing (NLP) open source library. NLTK provides extendible implementations for basic NLP processing which may include sentence segmentation, word tokenization, word lemmatization, part-of-speech (POS) tagging, shallow parsing ("chunking"), and text classification. Word tokens may be generated using various tokenizing techniques available in NLTK. For example, the text may be read via a whitespace tokenizer that splits the text into a sequence of whitespace delimited tokens. The sequence may be filtered, for example, by removing all words less a selected threshold, such as five (5) characters long and by removing stop words (e.g., 'the', 'is', 'are', etc.). In another example, the text may be read via a punctuation tokenizer that splits the text into a sequence of alphabetic and non-alphabetic characters. In yet another example, the text may be read via a treebank word tokenizer that splits the text into a sequence of words. For example, a treebank tokenizer splits standard contractions, treats most punctuation characters as separate tokens, splits off commas and single quotes (when followed by whitespace), and separates periods that appear at the end of line.

In the example, NER tagging may also be applied to the sentences or transactions. NER tagging may recognize, for example, three (3) types of entities within a given transaction (e.g., business name, payment method/type, and payment platform). Each of the business name, payment method/type, and payment platform is defined in the dictionary. After applying NER tagging, business names, payment method/type, and platform has been extracted, while other data in the sentences or transactions has been tagged as "Other."

Standardization and Output Inferencing

Figure 11:
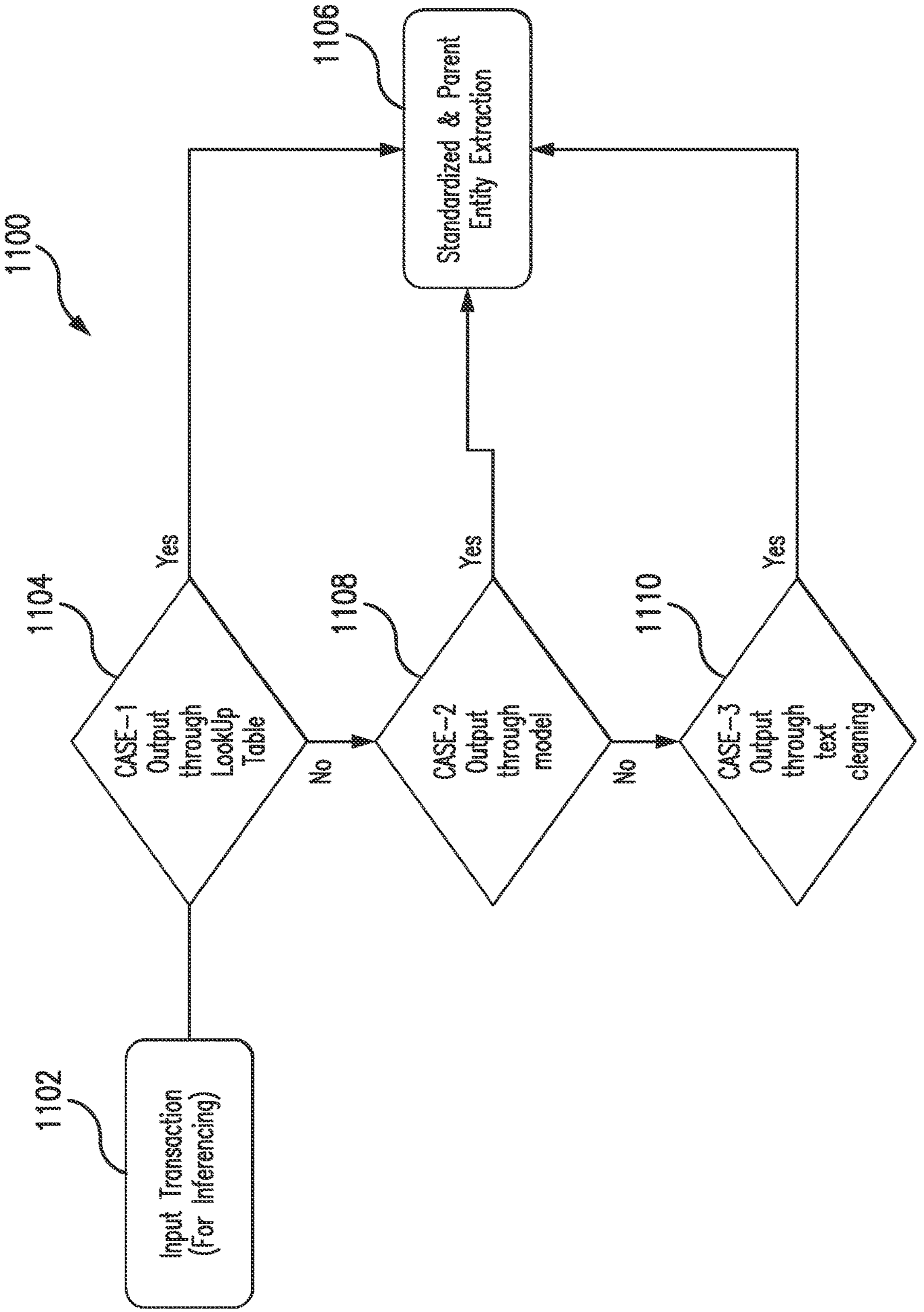
FIG. 11 is a flowchart illustrating an exemplary computer-implemented method for performing entity resolution on banking transaction data, in accordance with one embodiment of the present disclosure.

FIG. 11 is a flowchart illustrating an exemplary computer-implemented method 1100 for performing entity resolution on banking transaction data, in accordance with one embodiment of the present disclosure. The operations described herein may be performed in the order shown in FIG. 11 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 1100 is described below, for ease of reference, as being executed by exemplary devices and components introduced with the embodiments illustrated in FIGS. 1-4. In one embodiment, the computer-implemented method 1100 is implemented by the server 10. While operations within the computer-implemented method 1100 are described below regarding the server 10, according to some aspects of the present invention, the computer-implemented method 1100 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At step 1102, raw customer data (e.g., financial transaction data) is input to the trained entity resolution model for entity determination and standardization. At step 1104, the transaction data is passed through a lookup table process. The lookup table contains a direct mapping of each entity name with a standardized entity name and a parent entity name, if appropriate. A determination is made as to whether the entity name identified in the transaction data (e.g., for each respective transaction) is included in the lookup table. If the entity name is included in the lookup table, at step 1106 the standardized entity name and parent entity name are extracted from the lookup table and used to label the respective transaction.

If the entity name is not included in the lookup table, the transaction data is passed through the entity resolution model at step 1108. The entity name is inferenced (or predicted) based on the model analysis process. If the output from the model results in an entity name with an entity confidence score at or above a predetermined threshold value, the standardized entity name and parent entity name are extracted from the lookup table and used to label the respective transaction, as indicated at step 1106.

If the entity resolution model fails to identify an entity name that meets the predefined entity confidence score threshold value or fails to identify an entity in the transaction data, the transaction is then passed through a text clean output process at step 1110. The text clean output process simply passes the pre-processed input transaction data as an output from the model for manual determination of the standardized entity name and parent entity name.

The method 1100 may include additional, less, or alternate actions, including those discussed elsewhere herein such as in the section entitled "Exemplary System," and/or may be implemented via a computer system, communication network, one or more processors or servers, and/or computer-executable instructions stored on non-transitory storage media or computer readable medium.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

What is claimed is:

1. A computer-implemented method performed by a server for training a classification model, the method comprising:

receiving raw training data from a data source, the raw training data including labelled historical transaction data comprising a plurality of transactions, each transaction comprising textual transaction data;

inputting the raw training data into the classification model;

generating processed training data by performing a data preparation operation on the raw training data, including removing numerical characters, repeating special characters, and accent words from the textual transaction data;

performing vocabulary training on the processed training data, including tokenizing text of each transaction of the processed training data and converting the tokenized text into a transformer model specific format;

obtaining a transformer model;

training the classification model using the transformer model and the tokenized text in the transformer model specific format; and storing the trained classification model in a database, including storing model weights, a label dictionary, and trained tokenizer weights associated with the trained classification model.

2. The computer-implemented method in accordance with claim 1, receiving the raw training data comprises one or more of the following: retrieving the raw training data from the database and receiving the raw training data from one or more data source computing devices.

3. The computer-implemented method in accordance with claim 1, tokenizing the text of each transaction of the processed training data includes performing subword-based tokenization on the processed training data.

4. The computer-implemented method in accordance with claim 3, performing the subword-based tokenization on the processed training data comprises:

initializing a word unit inventory with all the characters in the text of each transaction of the processed training data;

building a language model on the processed training data using the word unit inventory; and generating a new word unit by combining two units out of the word inventory.

5. The computer-implemented method in accordance with claim 1, performing the vocabulary training on the processed training data includes using a BERTWordPieceTokenizer.

6. The computer-implemented method in accordance with claim 1, obtaining the transformer model includes obtaining a DistilBert transformer model.

7. The computer-implemented method in accordance with claim 1, further comprising determining whether training criteria for the classification model are met, the training criteria comprising one or more of the following: a target loss accuracy, a depth for recall at a specified percentage, and an F1 measure.

8. A server for training a classification model, the server comprising:

a database;

one or more processors; and a memory storing computer-executable instructions, that when executed by the one or more processors, cause the one or more processors to:

receive raw training data from a data source, the raw training data including labelled historical transaction data comprising a plurality of transactions, each transaction comprising textual transaction data;

input the raw training data into the classification model;

generate processed training data by performing a data preparation operation on the raw training data, including removing numerical characters, repeating special characters, and accent words from the textual transaction data;

perform vocabulary training on the processed training data, including tokenizing text of each transaction of the processed training data and converting the tokenized text into a transformer model specific format;

obtain a transformer model;

train the classification model using the transformer model and the tokenized text in the transformer model specific format; and store the trained classification model in the database, including storing model weights, a label dictionary, and trained tokenizer weights associated with the trained classification model.

9. The server in accordance with claim 8, receiving the raw training data comprises one or more of the following: retrieving the raw training data from the database and receiving the raw training data from one or more data source computing devices.

10. The server in accordance with claim 8, tokenizing the text of each transaction of the processed training data includes performing subword-based tokenization on the processed training data.

11. The server in accordance with claim 10, performing the subword-based tokenization on the processed training data comprises:

initializing a word unit inventory with all the characters in the text of each transaction of the processed training data;

building a language model on the processed training data using the word unit inventory; and generating a new word unit by combining two units out of the word inventory.

12. The server in accordance with claim 8, performing the vocabulary training on the processed training data includes using a BERTWordPieceTokenizer.

13. The server in accordance with claim 8, obtaining the transformer model includes obtaining a DistilBert transformer model.

14. The server in accordance with claim 8, said computer-executable instructions causing the one or more processors to determine whether training criteria for the classification model are met, the training criteria comprising one or more of the following: a target loss accuracy, a depth for recall at a specified percentage, and an F1 measure.

15. A non-transitory computer-readable storage medium having computer-executable instructions stored thereon, the computer-executable instructions, when executed by one or more processors, causing the one or more processors to:

receive raw training data from a data source, the raw training data including labelled historical transaction data comprising a plurality of transactions, each transaction comprising textual transaction data;

input the raw training data into a classification model;

generate processed training data by performing a data preparation operation on the raw training data, including removing numerical characters, repeating special characters, and accent words from the textual transaction data;

perform vocabulary training on the processed training data, including tokenizing text of each transaction of the processed training data and converting the tokenized text into a transformer model specific format;

obtain a transformer model;

train the classification model using the transformer model and the tokenized text in the transformer model specific format; and store the trained classification model in a database, including storing model weights, a label dictionary, and trained tokenizer weights associated with the trained classification model.

16. The non-transitory computer-readable storage medium in accordance with claim 15, receiving the raw training data comprises one or more of the following: retrieving the raw training data from the database and receiving the raw training data from one or more data source computing devices.

17. The non-transitory computer-readable storage medium in accordance with claim 15, tokenizing the text of each transaction of the processed training data includes performing subword-based tokenization on the processed training data.

18. The non-transitory computer-readable storage medium in accordance with claim 17, performing the subword-based tokenization on the processed training data comprises:

initializing a word unit inventory with all the characters in the text of each transaction of the processed training data;

building a language model on the processed training data using the word unit inventory; and generating a new word unit by combining two units out of the word inventory.

19. The non-transitory computer-readable storage medium in accordance with claim 15, performing the vocabulary training on the processed training data includes using a BERTWordPieceTokenizer.

20. The non-transitory computer-readable storage medium in accordance with claim 15, obtaining the transformer model includes obtaining a DistilBert transformer model.

* * * * *